US009082171B2

(12) United States Patent
Tsai et al.

(10) Patent No.: US 9,082,171 B2
(45) Date of Patent: Jul. 14, 2015

(54) IMAGE PROCESSING DEVICE FOR REDUCING IMAGE NOISE AND THE METHOD THEREOF

(71) Applicant: Industrial Technology Research Institute, Hsinchu (TW)

(72) Inventors: Luo-Wei Tsai, Kaohsiung (TW);
Kual-Zheng Lee, Chiayi County (TW);
Pang-Chan Hung, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 196 days.

(21) Appl. No.: 13/936,224

(22) Filed: Jul. 8, 2013

(65) Prior Publication Data
US 2014/0321768 A1 Oct. 30, 2014

(30) Foreign Application Priority Data

Apr. 25, 2013 (TW) .............................. 102114831 A (51) Int. Cl.
*G06T 5/00* (2006.01)
*G06T 5/20* (2006.01)
(52) U.S. Cl.
CPC . *G06T 5/002* (2013.01); *G06T 5/20* (2013.01); G06T 2207/20221 (2013.01)
(58) Field of Classification Search
USPC ........................................................ 382/263
See application file for complete search history.

(56) References Cited

U.S. PATENT DOCUMENTS

| 4,503,461 | A |   | 3/1985  | Nishimura |         |
| 5,481,628 | A | * | 1/1996  | Ghaderi ........................ | 382/261 |
| 5,491,759 | A | * | 2/1996  | Nagao et al. .................. | 382/199 |
| 6,681,054 | B1 |  | 1/2004  | Gindele    |         |
| 6,731,806 | B1 |  | 5/2004  | Gindele    |         |
| 6,973,219 | B2 |  | 12/2005 | Avinash    |         |
| 7,437,013 | B2 | * | 10/2008 | Anderson ..................... | 382/261 |
| 7,821,579 | B2 |  | 10/2010 | Lin et al.  |         |

(Continued)

FOREIGN PATENT DOCUMENTS

| CN | 102098422 | 6/2011 |
| TW | 200733720 | 9/2007 |

(Continued)

OTHER PUBLICATIONS

Rafael C. Gonzalez, et al., "Digital Image Processing" Prentice-Hall, Second Edition, Ch.1-Ch.3, 2002, pp. 1-190.

(Continued)

*Primary Examiner* — Ishrat I Sherali
(74) *Attorney, Agent, or Firm* — Jianq Chyun IP Office (57) ABSTRACT

An image processing device for reducing image noise and the method thereof are provided. The method for reducing image noise includes the following steps. A filtering operation is performed on a plurality of pixel values of a first image according to a high-pass (HP) filtering mask, a first default filtering mask and a second default filtering mask to obtain a high-pass filtering image, a first low-pass (LP) image and a second LP image, respectively. A difference between the first and the second LP images is calculated to obtain a LP difference image. A pixel weighting calculation is performed according to the HP image and the LP difference image to obtain a pixel weighting mask corresponding to the first image. The first image is calculated according to the pixel weighting mask and one of the first and the second LP images to obtain a noise reducing image.

17 Claims, 9 Drawing Sheets

(56) References Cited

U.S. PATENT DOCUMENTS

| | | | |
|---|---|---|---|
| 7,840,088 B2 | 11/2010 | Huang et al. | |
| 7,936,941 B2* | 5/2011 | Sumiya et al. | 382/266 |
| 8,050,509 B2 | 11/2011 | Jeong et al. | |
| 8,331,717 B2* | 12/2012 | Hou et al. | 382/260 |
| 2005/0135700 A1* | 6/2005 | Anderson | 382/261 |
| 2007/0009170 A1 | 1/2007 | Lin et al. | |
| 2010/0027905 A1 | 2/2010 | Zhang et al. | |
| 2010/0220939 A1 | 9/2010 | Tourapis et al. | |
| 2014/0185952 A1* | 7/2014 | Cabral | 382/263 |

FOREIGN PATENT DOCUMENTS

| | | |
|---|---|---|
| TW | 200929075 | 7/2009 |
| TW | 200931947 | 7/2009 |
| TW | M403069 | 5/2011 |

OTHER PUBLICATIONS

Sylvain Paris, et al., "Bilateral Filtering: Theory and Applications", Now Publishers Inc., Foundations and Trends in Computer Graphics and Vision, vol. 4, No. 1, 2008, pp. 1-75.

Fredo Durand, et al, "Fast Bilateral Filtering for the Display of High-Dynamic-Range Images", SIGGRAPH, Proceedings of the 29th annual conference on Computer graphics and interactive techniques, 2002, pp. 257-266.

Fatih Porikli, "Constant Time O(1) Bilateral Filtering", IEEE, Conference on Computer Vision and Pattern Recognition, Jul. 2008, pp. 1-10.

Sylvain Paris, et al., "A Fast Approximation of the Bilateral Filter using a Signal Processing Approach" International Journal of Computer Vision, vol. 81, Issue 1, Jan. 2009, pp. 1-39.

Kaiming He, et al., "Guided Image Filtering", Proceedings of the 11th European conference on Computer vision, 2010, pp. 1-14.

Luca Bertelli, et al., "Edge Preserving Filters Using Geodesic Distances on Weighted Orthogonal Domains", IEEE, International Conference on Image Processing, 2007, pp. 1-4.

Qingxiong Yang, et al., "SVM for Edge-Preserving Filtering", IEEE, Conference on Computer Vision and Pattern Recognition (CVPR), 2010, pp. 1-8.

Zhou Wang, et al., "Image Quality Assessment: From Error Visibility to Structural Similarity", IEEE, Transactions on Image Processing, vol. 13, No. 4, Apr. 2004, pp. 600-612.

Dasgupta et al., "Lateral Inhibition based Holistic Approach to Adaptive Image Enhancement," 2013 3rd IEEE International Advance Computing Conference (IACC), Feb. 2013, pp. 1143-1148.

"Office Action of Taiwan Counterpart Application", issued on May 7, 2015, p1-p3, in which the listed references were cited.

* cited by examiner

| -1 | 0 | 1 |
|---|---|---|
| -2 | 0 | 2 |
| -1 | 0 | 1 |

1010

| -1 | -2 | -1 |
|---|---|---|
| 0 | 0 | 0 |
| 1 | 2 | 1 |

| 0.003 | 0.013 | 0.022 | 0.013 | 0.003 |
|---|---|---|---|---|
| 0.013 | 0.060 | 0.098 | 0.060 | 0.013 |
| 0.022 | 0.098 | 0.162 | 0.098 | 0.022 |
| 0.013 | 0.060 | 0.098 | 0.060 | 0.013 |
| 0.003 | 0.013 | 0.022 | 0.013 | 0.003 |

1120

| 0.014 | 0.028 | 0.035 | 0.028 | 0.014 |
|---|---|---|---|---|
| 0.028 | 0.055 | 0.068 | 0.055 | 0.028 |
| 0.035 | 0.068 | 0.085 | 0.068 | 0.035 |
| 0.028 | 0.055 | 0.068 | 0.055 | 0.028 |
| 0.014 | 0.028 | 0.035 | 0.028 | 0.014 |

IMAGE PROCESSING DEVICE FOR REDUCING IMAGE NOISE AND THE METHOD THEREOF

CROSS-REFERENCE TO RELATED APPLICATION

This application claims the priority benefit of Taiwan application serial no. 102114831, filed on Apr. 25, 2013. The entirety of the above-mentioned patent application is hereby incorporated by reference herein and made a part of this specification.

TECHNICAL FIELD

The disclosure relates to an image processing device for reducing image noise and a method thereof.

BACKGROUND

Along with development of multimedia technology, demand on high-definition image is gradually increased. Image quality is greatly related to the amount of noises generated during an image capturing process, a signal conversion process and a transmission process. In order to effectively remove the noises to improve the image quality, researches on noise elimination in the image processing domain draws more and more attention. A reason for the formation of the noise is, for example, variation of ambient light source which results in generation of random noise on an image capturing unit, noises generated by the circuit itself, or noises generated during an image processing process (for example, white balance, image interpolation). Therefore, images captured in the night generally have strong noises.

In filtering processing, a filter is generally used to adjust pixel values of an image, so as to eliminate the noise. However, if the pixel values are excessively adjusted to eliminate the noise, image details are also weakened to cause unclarity of the image. Therefore, it is required to reach a balance between clarity of image details and noise elimination.

In the current image noise reducing technique, a weight value of a filter can be dynamically adjusted to implement image filtering processing to achieve a good noise reducing effect, though it has problems of high operation complexity and requiring an additional reference image to cause memory consumption, etc. which results in a fact that the noise reducing techniques are not easy to be integrated to a video encoder or a digital signal processor.

SUMMARY

One of exemplary embodiments is directed to an image processing device for reducing image noise and a method thereof, in which a predetermined high-pass filter and two low-pass filters are used to produce a mask capable of filtering noises and keeping image details, and use the mask to adjust an input image, so as to greatly keep image details while filtering noises. In this way, the image processing device is capable of decreasing operation complexity and is unnecessary to additionally refer other images to cause memory consumption.

One of exemplary embodiments provides a method for reducing image noise, which includes the following steps. A high-pass filtering operation is performed on a plurality of pixels of a first image according to a default high-pass filtering mask to obtain a high-pass image. A low-pass filtering operation is performed on the pixels of the first image according to a first default filtering mask and a second default filtering mask to respectively obtain a first low-pass image and a second low-pass image, where the first default filtering mask is different to the second default filtering mask. A difference calculation is performed on the first low-pass image and the second low-pass image to obtain a low-pass difference image. A pixel weighting calculation is performed according to the high-pass image and the low-pass difference image to obtain a pixel weighting mask corresponding to the first image. The first image is calculated according to the pixel weighting mask and one of the first and the second low-pass images to obtain a noise reducing image.

According to another aspect, one of exemplary embodiments provides an image processing device including an image obtaining unit and a processor. The image obtaining unit is configured to obtain a first image. The processor executes following steps. A high-pass filtering operation is performed on a plurality of pixels of the first image according to a default high-pass filtering mask to obtain a high-pass image. A low-pass filtering operation is performed on a plurality of pixels of the first image according to a first default filtering mask and a second default filtering mask to respectively obtain a first low-pass image and a second low-pass image, where the first default filtering mask is different to the second default filtering mask. A difference calculation is performed on the first low-pass image and the second low-pass image to obtain a low-pass difference image. A pixel weighting calculation is performed according to the high-pass image and the low-pass difference image to generate a pixel weighting mask corresponding to the first image. The first image is calculated according to the pixel weighting mask and one of the first and the second low-pass images to obtain a noise reducing image.

One of exemplary embodiments provides an image processing device including at least one high-pass filter, at least two low-pass filters, a difference calculation module, a pixel weighting calculation module, and an image merging module. The at least one high-pass filter receives a first image, and performs a high-pass filtering operation on a plurality of pixels of the first image according to a default high-pass filtering mask to obtain a high-pass image. The at least two low-pass filters perform a low-pass filtering operation on the pixels of the first image according to different default filtering masks to generate at least two low-pass images The difference calculation module performs a difference calculation on the at least two low-pass images to obtain a low-pass difference image. The pixel weighting calculation module performs a pixel weighting calculation according to the high-pass image and the low-pass difference image to generate a pixel weighting mask corresponding to the first image. The image merging module calculates the first image according to the pixel weighting mask and one of the first low-pass image and the second low-pass image to generate a noise reducing image.

According to the above descriptions, in the disclosure, the high-pass image generated through high-pass filtering operation and the difference image between two low-pass images generated through the low-pass filtering operation are used to generate a mask capable of filtering noises and keeping image details, for example, the mask can keep original image information of block edges and block interleaving portions in the input image, and the mask is used to calculate and adjust the input image to filter noises and significantly keep image details to obtain a clear image. Moreover, since only a default high-pass filter and two low-pass filters are required to implement the above processing, and the required pixel mask is obtained through a fixed algorithm, the calculation complexity is decreased, and it unnecessary to additionally refer other images to cause memory consumption.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

In an image processing technique, in order to reduce noises of an image, a filter is generally used to perform a convolution operation on each pixel in the image, so that a weighting value of a mask used in the filter is a key factor that influences image quality. The filter can be a constant value filter or a non-constant value filter. The constant value filter is to process each pixel by using a same low-pass filtering mask, which is simple but easy to generate an image blur phenomenon, for example, a mean filter and a Gaussian filter. The non-constant value filter is to dynamically adjust the weighting value of the mask in the filter according to a regional characteristic of each pixel, where if the pixel is at boundary (high frequency), the weighting value is higher, and if the pixel is smooth (low frequency), the weighting value is lower, so as to reduce the noise to obtain a clear image, which is, for example, a bilateral filter or a pilot filter. However, the Gaussian filter and the bilateral filter have to perform a large amount of exponential operations when calculating the weighting value of the mask, which leads to higher operation load. The pilot filter has to refer another image to serve as a reference for calculating the weighting value of the mask, which leads to extra memory consumption to increase the implementation cost.

In order to ameliorate operation performance for noise elimination, and achieve a better noise filtering effect without increase a memory demand, in an image processing device of the disclosure, a default constant value high-pass filter is used to obtain edge characteristics of in input image, and two constant value low-pass filters are used to obtain texture characteristics of the input image to reduce noise. In this way, the image processing device of the disclosure is unnecessary to additionally refer other images, and the hardware can be used for parallel processing. Embodiments in accordance with the exemplary embodiments of the disclosure are provided below, though the disclosure is not limited to the following embodiments.

Figure 1:
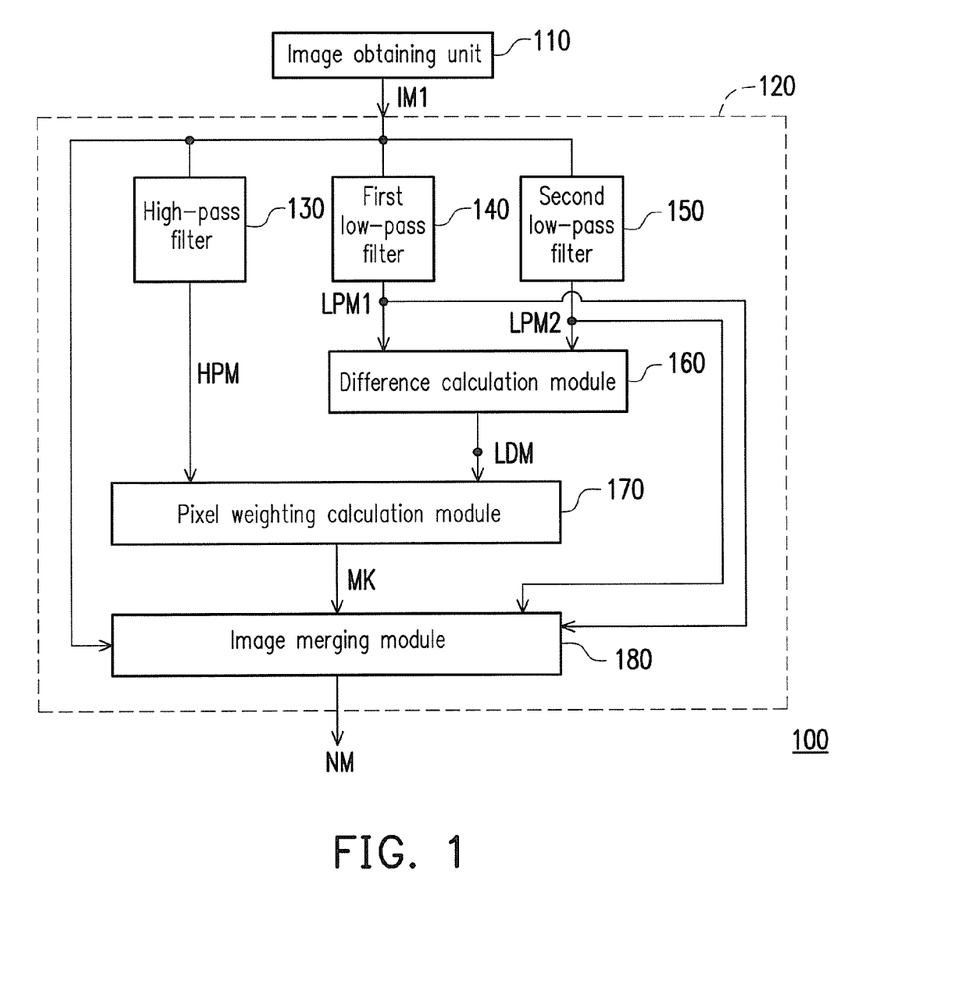
FIG. 1 is a block diagram of an image processing device according to an embodiment of the disclosure.

FIG. 1 is a block diagram of an image processing device 100 according to an embodiment of the disclosure. The image processing device 100 of the disclosure is applied to reduce noises of input images, especially strong noises of input images at night, so that the image processing device 100 is adapted to electronic equipment such as cameras, video cameras, mobile device, etc., or an image processing procedure complied with the embodiment of the disclosure.

The image processing device 100 mainly includes an image obtaining unit 110 and a noise control unit 120. The image obtaining unit 110 is configured to obtain a first image IM1 (or referred to as an input image). The image obtaining unit 110 can be a camera, a video camera, an image acquisition chip or even a hard disk used for storing images, etc. In some embodiments, the image processing device 100 does not have the image obtaining unit 110, but directly obtains the first image IM1 from external equipment.

The noise control unit 120 receives the first image IM1, and reduces noise of the first image IM1 to produce a noise reducing image NM. The noise control unit 120 can be a processor used fro executing the image processing procedure complied with the embodiment of the disclosure, or can be hardware used for implementing functions of the disclosure through circuit modules. The term "module" referred in the embodiment of the disclosure can be a software module executed by the processor, or can be a hardware or firmware module implemented by circuits. After the noise reducing image NM is generated, the image processing device 100 can store the noise reducing image NM to a computer access device (for example, output the noise reducing image to a network, a hard disk, etc.), output the noise reducing image NM to an image video encoder or display the same on a screen, and application of the noise reducing image NM is not limited by the disclosure.

Figure 2:
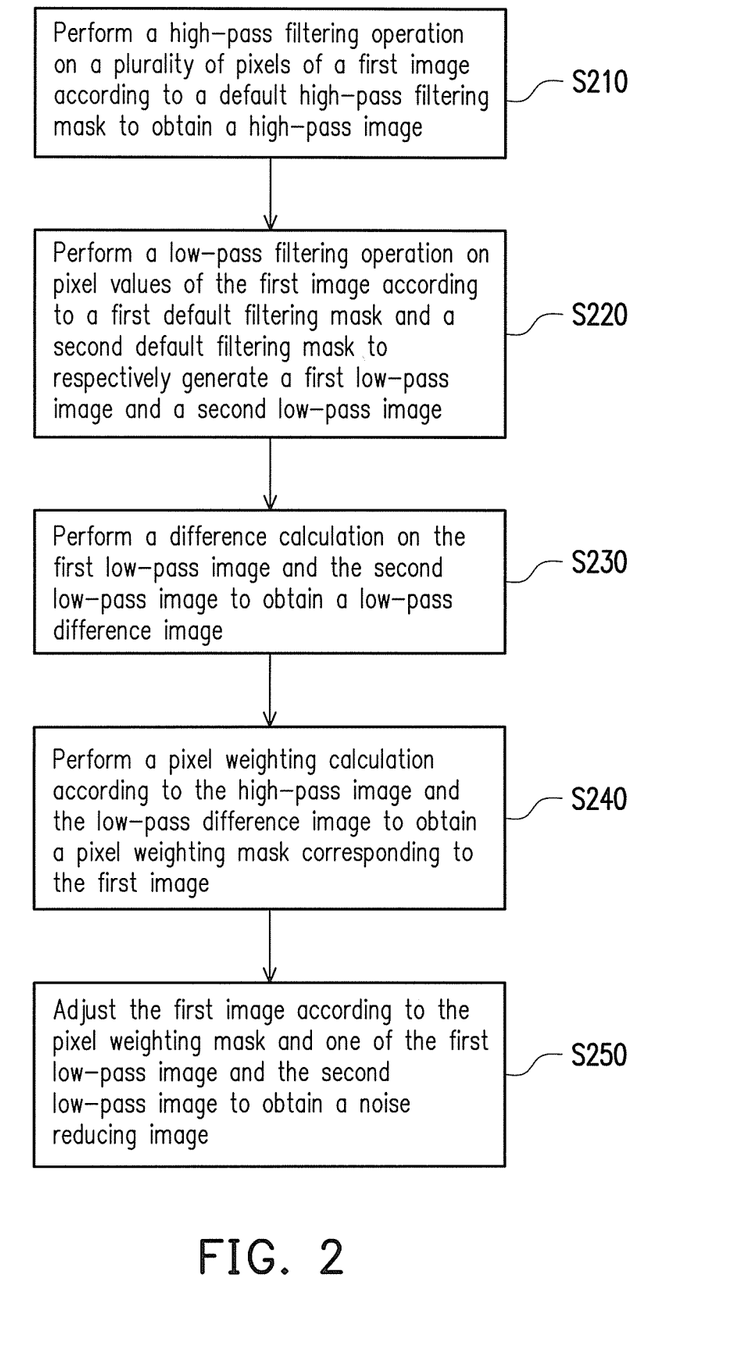
FIG. 2 is a flowchart illustrating a method for reducing image noise according to an embodiment of the disclosure.
Figure 3:
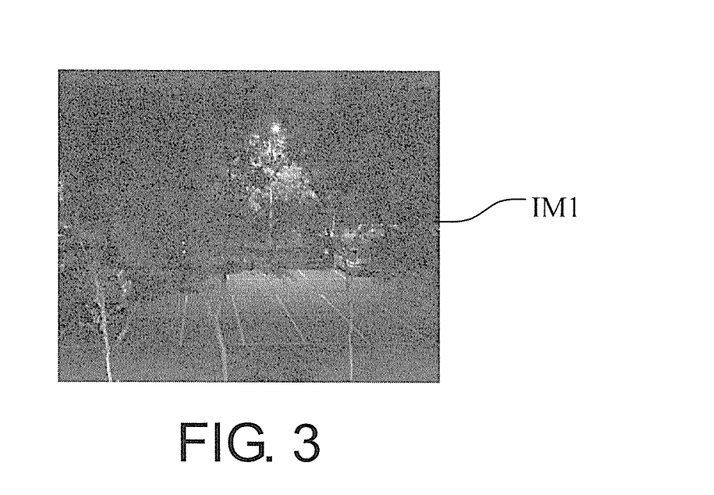
FIG. 3 to FIG. 8 illustrate various images according to an embodiment of the disclosure.
Figure 4:
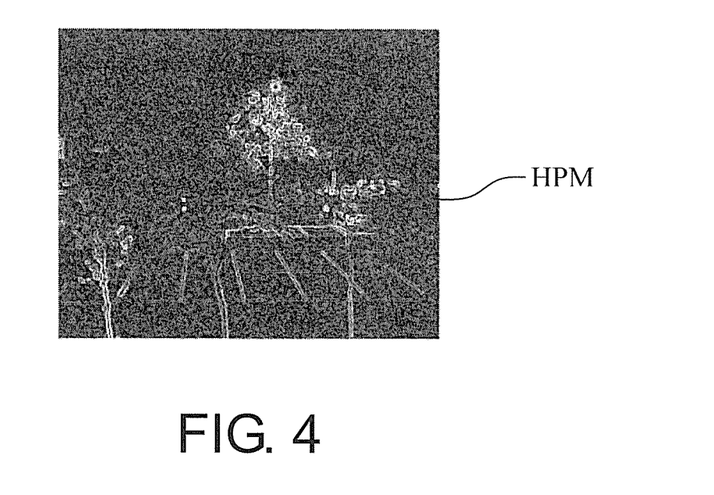

The noise reducing unit 120 includes a high-pass filter 130, a first low-pass filter 140, a second low-pass filter 150, a difference calculation module 160, a pixel weighting calculation module 170 and an image merging module 180. Functions of various components in the noise reducing unit 120 are described below in collaboration with a method for reducing image of FIG. 2. FIG. 2 is a flowchart illustrating a method for reducing image noise according to an embodiment of the disclosure. FIG. 3 to FIG. 8 illustrate various images according to an embodiment of the disclosure. Referring to FIG. 1 and FIG. 2 and the images of FIG. 3 to FIG. 8. In step S210, after the high-pass filter 130 receives the first image IM1, for example, the first image IM1 of FIG. 3, the high-pass filter 130 performs a high-pass filtering operation on a plurality of pixels of the first image IM1 according to a default high-pass filtering mask to obtain a high-pass image HPM, for example, the high-pass image HPM of FIG. 4. The high-pass image HPM highlights edge characteristics of the first image IM1. The high-pass filter 130 of the disclosure is a constant value high-pass filter, in other words, the high-pass filtering mask used by the high-pass filter 130 is a constant value, and is not a high-pass filtering mask with dynamically adjusted weighting value. In some embodiments of the disclosure, the high-pass filtering operation can also be implemented by a plurality of high-pass filters, and the disclosure is not limited to use the single high-pass filter to implement the above high-pass filtering procedure.

Figure 5A:
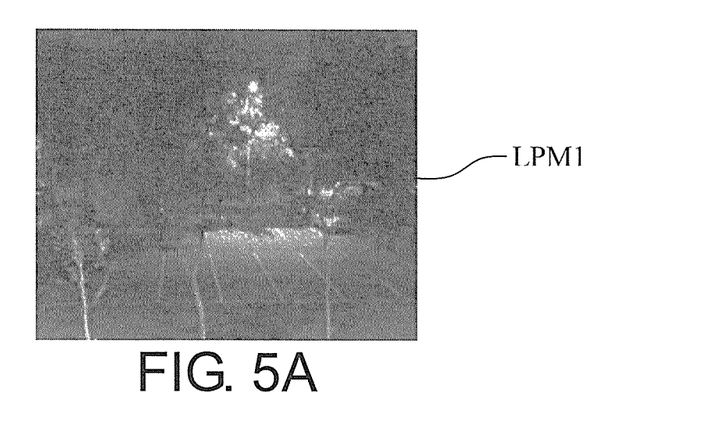
Figure 5B:
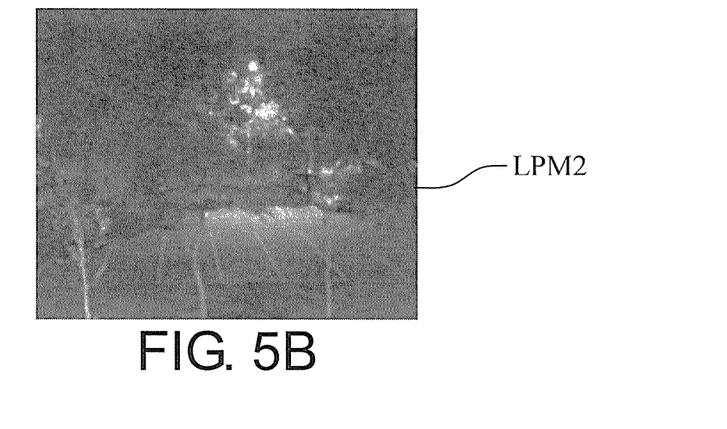

In step S220, the first low-pass filter 140 and the second low-pass filter 150 respectively perform a low-pass filtering operation on a plurality of pixel values of the first image IM1 according to a first default filtering mask and a second default filtering mask to respectively generate a first low-pass image LPM1 and a second low-pass image LPM2. FIG. 5 illustrates the first low-pass image LPM1 and the second low-pass image LPM2 according to the embodiment of FIG. 3 of the disclosure. The two low-pass filters 140 and 150 of the disclosure are also constant value low-pass filters with a low operation amount, and the low-pass filtering mask used by the low-pass filters 140 and 150 is a constant value, and is not a low-pass filtering mask with dynamically adjusted weighting value. Moreover, the first default filtering mask used by the first low-pass filter 140 is different to the second default filtering mask used by the second low-pass filter 150.

It should be noticed that in the present embodiment, the two low-pass filters 140 and 150 may used for implementation, and based on the aforementioned hardware configuration, the two low-pass filters 140 and 150 and the high-pass filter 130 can simultaneously execute the steps S210 and S220. Namely, in the step S220, the two low-pass filters 140 and 150 respectively having the first default filtering mask and the second default filtering mask are used to process the first image IM1. When the image processing device 100 is used for processing a static image, i.e. it has a less demanding on the speed of image processing, the low-pass filters 140 and 150 can be integrated into the same hardware or a same processing procedure to execute twice low-pass filtering operations on the first image IM1 by using two different constant value low-pass filtering masks, so as to produce the two low-pass images LPM1 and LPM2. Namely, in the step S220, in some embodiments of the disclosure, one low-pass filter may used to perform the filtering operation on the first image IM1 by using different default filtering masks.

Figure 6:
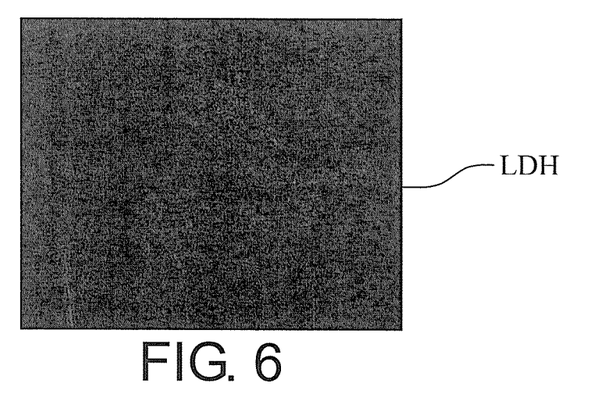
Figure 7:
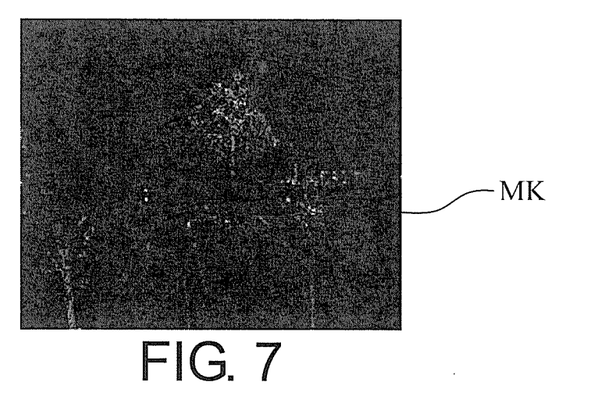
Figure 8:
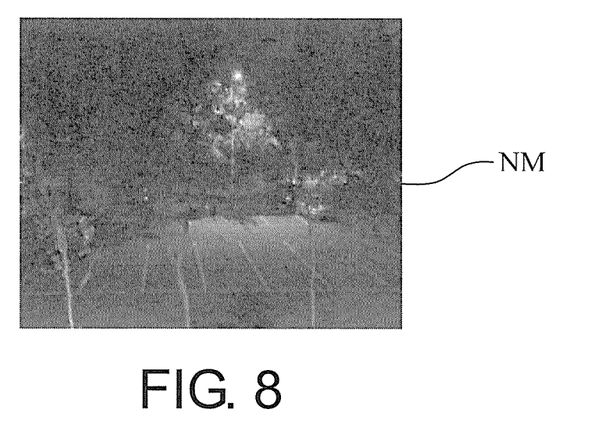

Referring to FIG. 1 and FIG. 2, in step S230, after the difference calculation module 160 receives the first and the second low-pass images LPM1 and LPM2, the difference calculation module 160 performs a difference calculation on the first low-pass image LPM1 and the second low-pass image LPM2 to obtain a low-pass difference image LDM (shown in FIG. 6). The low-pass difference image LDM can keep the edge characteristics in the first image IM1 and reduce the noise in the first image IM1. In other embodiments, those skilled in the art can use more than two low-pass filters to obtain more than two low-pass images, and perform a difference operation or a subtraction operation by using the low-pass images to obtain the low-pass difference image LDM, so that the disclosure is not limited to use only two low-pass filters 140 and 150 to obtain the low-pass difference image LDM.

In step S240, the pixel weighting calculation module 170 performs a pixel weighting calculation according to the high-pass image HPM (shown in FIG. 4) and the low-pass difference image LDM (shown in FIG. 6) to calculate a weighting value of each pixel in the first image IM1, and configure the weighting values to the mask at corresponding positions, so as to obtain a pixel weighting mask MK corresponding to the first image IM1. The pixel weighting mask MK is as that shown in FIG. 7.

In step S250, the image merging module 180 calculates the first image IM1 according to the pixel weighting mask MK and one of the first low-pass image LPM1 and the second low-pass image LPM2 to obtain the noise reducing image NM. The noise reducing image NM is as that shown in FIG. 8.

Figure 9:
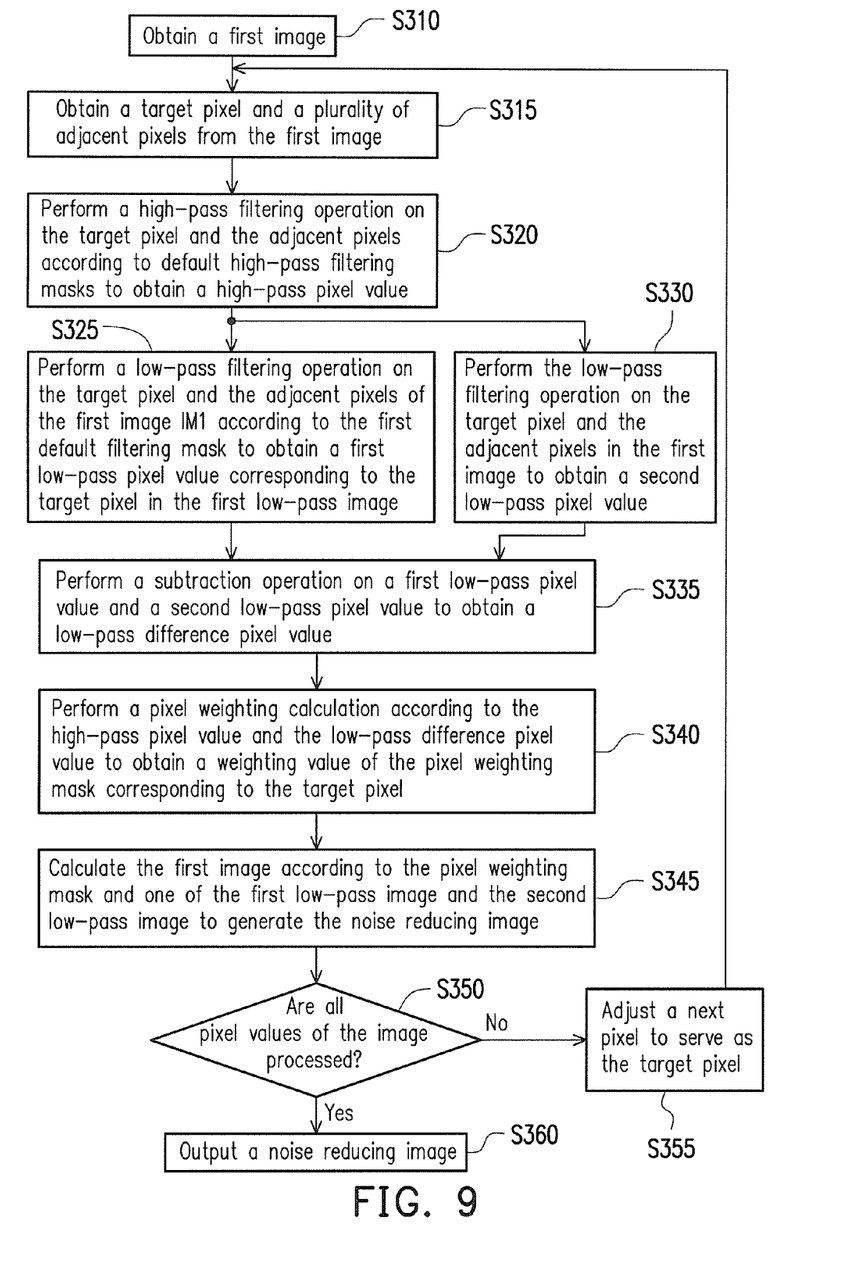
FIG. 9 is a detailed flowchart illustrating a method for reducing image noise according to an embodiment of the disclosure.

In the embodiment of FIG. 2, the whole image is taken as an example to describe the method for reducing image noise of the disclosure, and in the following content, the method for reducing image noise of the disclosure is described based on each pixel in the image, and various parameters of the disclosure are listed below. FIG. 9 is a detailed flowchart illustrating a method for reducing image noise according to an embodiment of the disclosure.

Figure 10:
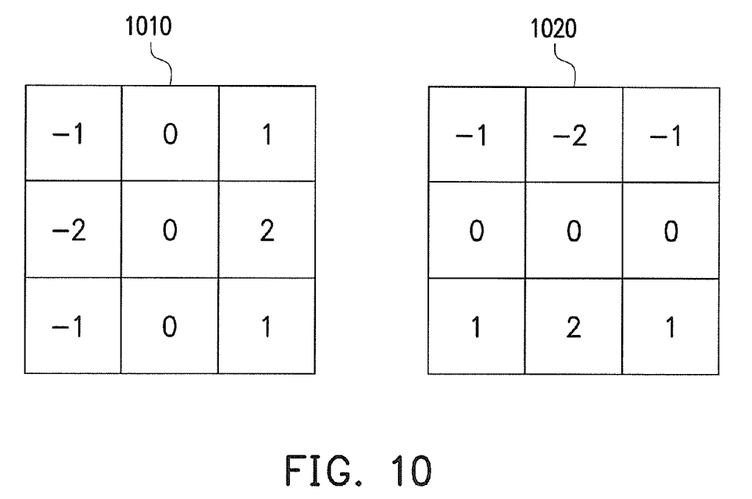
FIG. 10 illustrates two default high-pass filtering masks applied in an embodiment of the disclosure.

Referring to FIG. 1 and FIG. 9, in step S310, the image obtaining unit 110 obtain the first image IM1. Then, in step S315, the image obtaining unit 110 obtains a target pixel and a plurality of adjacent pixels adjacent to the target pixel from the first image IM1. In step S320, after obtaining the target pixel and the adjacent pixels adjacent to the target pixel from the first image IM1, the high-pass filter 130 performs a high-pass filtering operation on the target pixel and the adjacent pixels according to default high-pass filtering masks shown in FIG. 10 to obtain a high-pass pixel value $H_p$ corresponding to the target pixel in the high-pass image HPM. FIG. 10 illustrates two default high-pass filtering masks 1010 and 1020 applied in the embodiment of the disclosure. Weighting values in the default high-pass filtering masks are all real numbers. The default high-pass filtering mask 1010 is adapted to the high-pass filtering operation of a Y-axis direction (i.e. a vertical direction), and the default high-pass filtering mask 1020 is adapted to the high-pass filtering operation of an X-axis direction (i.e. a horizontal direction), and those skilled in the art can adjust the weighting values in the default constant value high-pass filtering masks according to an actual requirement.

It is assumed that a high-pass filtering function is $f_h$, and the high-pass filtering function $f_h$ varies along with variation of the high-pass filtering mask. $I_p$ represents a pixel value (for example, a color value) of the target pixel in the first image IM1, $H_p$ represents a high-pass pixel value corresponding to the target pixel in the high-pass image HPM, and the high-pass pixel value $H_p$ output by the high-pass filter 130 is a convolution of the pixel value $I_p$ of the target pixel and the weighting value W of the high-pass filtering mask 1010 or 1020 and each pixel point q in the mask, which is represented by a following equation (1):

$$H_p = \frac{1}{k_h(p)} \sum_{q \in W} f_h(q) \times I_q \qquad (1)$$

In equation (1), $k_h(p)$ is a normalization function. The normalization function of the disclosure is used to limit a multiplication of each mask and pixel to be within a certain range without being too large. Therefore, values of the normalization function are all between a default value (for example, "1") and 0. For example, the normalization function $k_h(p)$ can be represented by a following equation (2):

$$k_h(p) = \Sigma_{q \in W} f_h(q) \qquad (2)$$

In the disclosure, two high-pass filtering operations may be performed on the first image IM1, where one is the high-pass filtering operation of the vertical direction, and another one is the high-pass filtering operation of the horizontal direction, and the calculated high-pass pixel values $H_p$ corresponding to the target pixel in the high-pass image HPM are added and divided by 2 to obtain a good high-pass image HPM.

Figure 11:
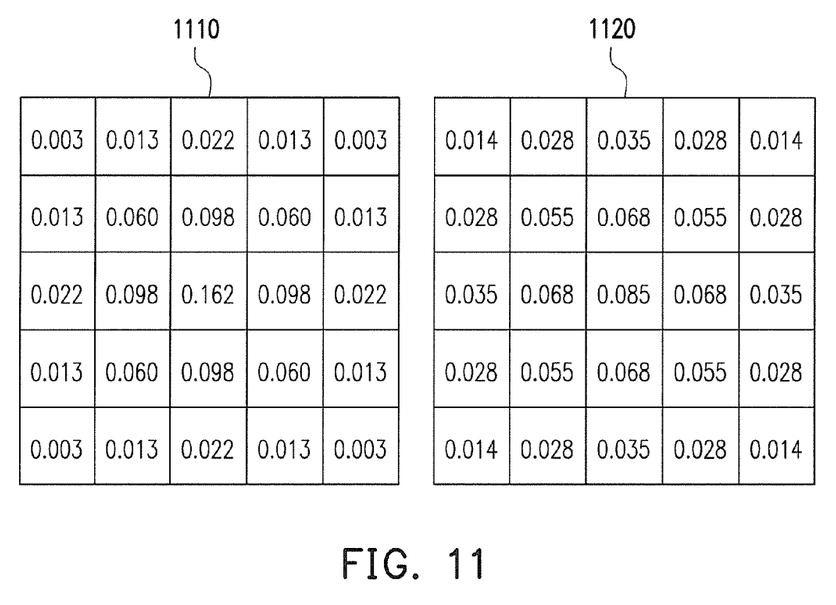
FIG. 11 illustrates a first default filtering mask and a second default filtering mask used in an embodiment of the disclosure.

In the step S325, the low-pass filter 140 performs a low-pass filtering operation on the target pixel and the adjacent pixels of the first image IM1 according to the first default filtering mask to obtain a first low-pass pixel value corresponding to the target pixel in the first low-pass image LPM1. The first default filtering mask is shown as a mask 1110 of FIG. 11. FIG. 11 illustrates a first default filtering mask 1110 and a second default filtering mask 1120 used in the present embodiment. In step S330, the low-pass filter 150 performs the low-pass filtering operation on the target pixel and the adjacent pixels in the first image IM1 according to a second default filtering mask to obtain a second low-pass pixel value corresponding to the target pixel in the second low-pass image LPM2. The first and the second default filtering masks 1110 and 1120 are constant values and a mutually different, which are all adapted to the low-pass filtering operation.

Therefore, the first low-pass filter 140 and the second low-pass filter 150 all apply a same low-pass filtering technique, so that one low-pass filtering function is provided below for implementation. It is assumed that a low-pass filtering function is $f_1$, and the low-pass filtering function $f_1$ varies along with variation of the first default filtering mask 1110 or the second default filtering mask 1120. $L_p$ represents a first low-pass pixel value or a second low-pass pixel value corresponding to the target pixel in the low-pass image LPM1 or LPM2. Therefore, the low-pass pixel value $L_p$ output by the low-pass filter 140 or 150 is a convolution of the pixel value $I_p$ of the target pixel and the weighting value W of the first or the second default filtering mask 1110 or 1120 and each pixel point q in the mask, which is represented by a following equation (3):

$$L_p = \frac{1}{k_l(p)} \sum_{q \in W} f_l(q) \times I_q \qquad (3)$$

In equation (3), $k_l(p)$ is a normalization function. The normalization function $k_l(p)$ can be represented by a following equation (4):

$$k_l(p) = \Sigma_{q \in W} f_l(q) \qquad (4)$$

In step S335, the difference calculation module 160 performs a subtraction operation on a first low-pass pixel value $L_{p1}$ corresponding to the target pixel and a second low-pass pixel value $L_{p2}$ corresponding to the target pixel to obtain a low-pass difference pixel value IDoG corresponding to the target pixel in the low-pass difference image LDM. When the difference calculation module 160 performs the difference calculation on the low-pass images LPM1 and LPM2 using two different default filtering masks, extremes or key structures of the low-pass images LPM1 and LPM2 in different dimensional spaces are found, which is referred to as difference of Gaussian (DoG).

It is assumed that the difference calculation module 160 applies a Gaussian filter G, and variables σi and σj are given to calculate the low-pass filtering values, the low-pass difference pixel value IDoG is a multiplication of the pixel value $I_p$ of the target pixel in the first image IM1 and a difference between two Gaussian filters Gσi and Gσj after the variables σi and σj are given, which is shown as a following equation (5):

$$IDoG = (G\sigma i - G\sigma j) \times I_p \qquad (5)$$

In step S340, the pixel weighting calculation module 170 performs a pixel weighting calculation according to the high-pass pixel value $H_p$ corresponding to the target pixel in the high-pass image HPM and the low-pass difference pixel value IDoG corresponding to the target pixel in the low-pass difference image LDM to obtain a weighting value of the pixel weighting mask corresponding to the target pixel. In other words, the high-pass image HPM obtained according to the equation (1) has important edge and texture characteristics of the first image IM1, and the low-pass difference image LDM obtained according to the equation (5) contains image boundary and extreme edge of the first image IM1, though both of which contain noises. Therefore, the high-pass image HPM and the low-pass difference image LDM are calculated to obtain the pixel weighting mask MK with stable edge and reduced noise to process the first image IM1, so as to obtain a fine and integral image structure.

It is assumed that the pixel weighting value corresponding to the target pixel in the pixel weighting mask MK is $B_p$, the pixel weighting value $B_p$ in the pixel weighting mask MK can be calculated according to a following equation (6):

$$B_p = \frac{1}{k_b} \times IDoG(p) \times H_p \qquad (6)$$

Where $K_b$ is a normalization function, which can be represented by a following equation (7):

$$k_b = \Sigma_{q \in J} IDoG(p) \times H_p \qquad (7)$$

In this way, the pixel weighting value $B_p$ corresponding to each target pixel in the pixel weighting mask MK can be obtained according to the equations (6) and (7).

In step S345, the image merging module 180 calculates the first image IM1 according to the pixel weighting mask MK and one of the first low-pass image LPM1 and the second low-pass image LPM2 to generate the noise reducing image NM. In detail, the image merging module 180 calculates the first image IM1 according to the pixel weighting mask MK and any one of the low-pass image (for example, one of the first low-pass image LPM1 and the second low-pass image LPM2) to generate a reducing pixel value $J_p$ in the noise reducing image NM with reduced noise. The reducing pixel value $J_p$ can be calculated according to a following equation (8):

$$J_p = B_p \times I_p + (RN - B_p) \times L_{p1} \qquad (8)$$

Where, $B_p$ is a pixel weighting value corresponding to the target pixel, $L_{p1}$ is a first low-pass pixel value corresponding to the target pixel and located in the first low-pass image LPM1. RN is a default value referred in normalization parameters. In the present embodiment, the default value RN is "1". In some embodiments, $L_{p1}$ can also be a second low-pass pixel value corresponding to the target pixel and located in the second low-pass image LPM2. In other words, the image merging module 180 multiplies the pixel value $I_p$ of the target pixel by the pixel weighting value $B_p$ corresponding to the target pixel for adding with a difference between the default value ("1") and the pixel weighting value $B_p$ times one of the first low-pass pixel value $L_{p1}$ and the second low-pass pixel value $L_{p2}$ corresponding to the target pixel, so as to obtain the reducing pixel value $J_p$ corresponding to the target pixel in the noise reducing image NM.

In step S350, the image processing device 100 determines whether reducing pixel value $J_p$ corresponding to all of the pixel values in the first image IM1 have been obtained. If the first image IM1 still has an unprocessed pixels, a step S355 is executed, by which the image processing device 100 takes the unprocessed pixel as the target pixel, and further executes the steps S315-S345 to calculate and obtain the reducing pixel value corresponding to the target pixel. If all of the pixels in the first image IM1 have been processed, the image processing device 100 completes processing each reducing pixel value $J_p$ in the noise reducing image NM, and executes a step S360 to output the noise reducing image NM.

Although some noise reducing techniques apply high-frequency filtering and low-frequency filtering to filter noises, by which although image textures are maintained, noise generation is also increased. In the disclosure, besides the high-frequency and low-frequency filtering operation are used in collaboration, a difference processing is further performed on two low-frequency filtering results to effectively filter the noises.

Figure 12:
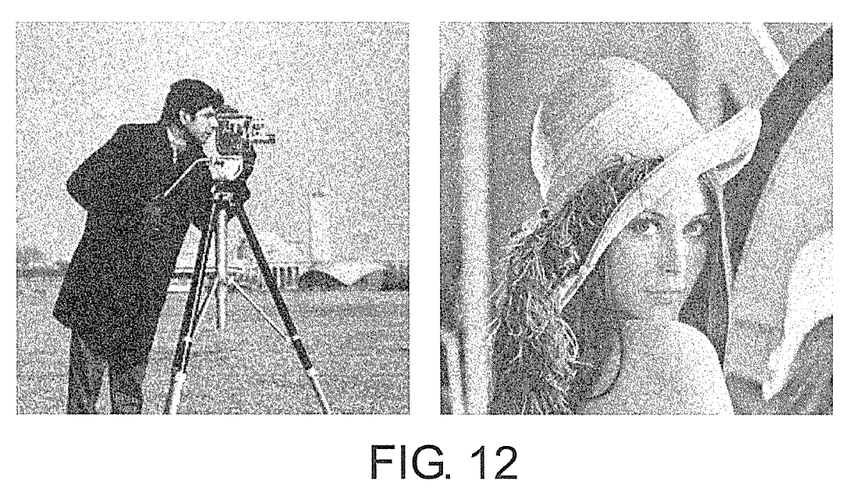
FIG. 12 is an example of input image.
Figure 13:
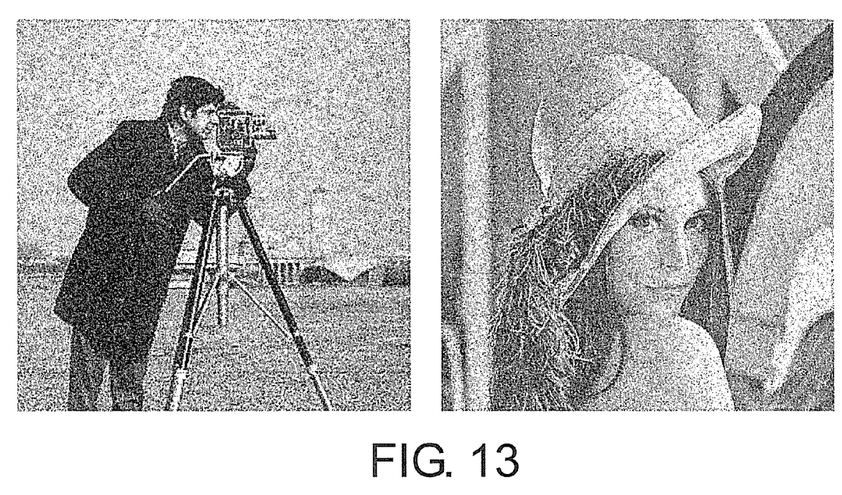
FIG. 13 illustrates images obtained by using a high-frequency and a low-frequency filtering operations in collaboration without performing a difference processing on two low-frequency filtering results to filter noise.
Figure 14:
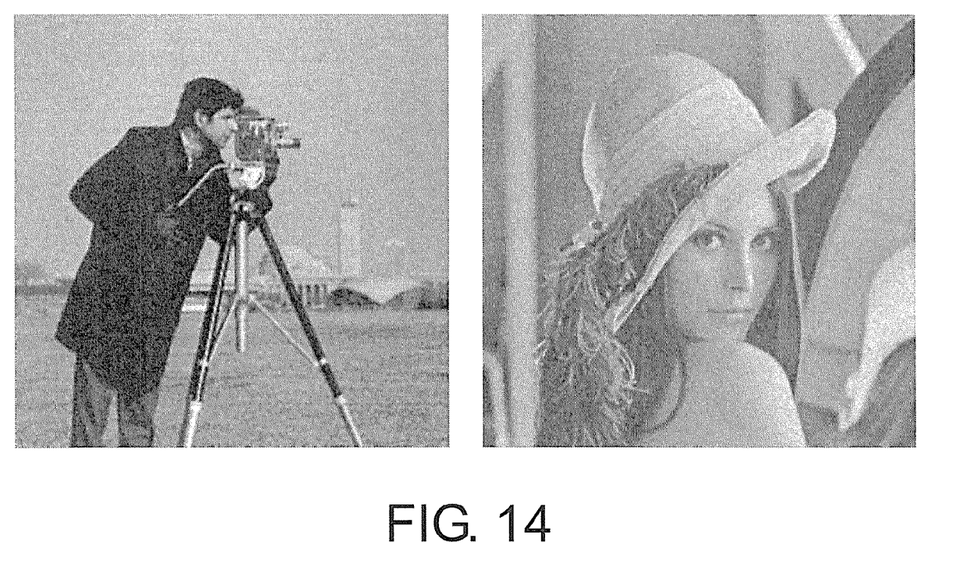
FIG. 14 illustrates noise-filtered images obtained according to a method complied with the embodiments of the disclosure.

For example, left and right images of FIG. 12 are all examples of input images, and FIG. 13 illustrates images obtained by using the high-frequency and the low-frequency filtering operations in collaboration without performing the difference processing on two low-frequency filtering results to filter noise (which is referred to as a method 1). FIG. 14 illustrates noise-filtered images obtained according to the method complied with the embodiments of the disclosure (which is referred to as a method of the disclosure). Through comparison of FIG. 13 and FIG. 14, it is obvious that although the method of FIG. 13 can keep the edge, the noises are also strengthened. Regarding the images of FIG. 14 generated according to the method of the disclosure, the edge is suitably kept and noises are effectively reduced.

Moreover, two commonly used indexes of peak signal-to-noise ratio (PSNR) and structural similarity (SSIM) in image processing are used to determine a noise degree of images of FIG. 13 and FIG. 14, which is shown in a following table (1).

TABLE (1)

| Noise reducing method | Left part of FIG. 12 (C.man) | | Right part of FIG. 12 (Lena) | |
|---|---|---|---|---|
| | PSNR | SSIM | PSNR | SSIM |
| Method 1 | 23.55 | 0.45 | 23.64 | 0.45 |
| Method of the disclosure | 28.4 | 0.75 | 28.79 | 0.74 |

The indexes PSNR and SSIM adopted by the disclosure are all the greater the better, and according to the table (1), it is known that the method of the disclosure is better than the method 1.

In summary, in the disclosure, the high-pass image generated through high-pass filtering operation and the difference image between two low-pass images generated through the low-pass filtering operation are used to generate a mask capable of filtering noises and keeping image details, for example, the mask can keep original image information of block edges and block interleaving portions in the input image, and the mask is used to adjust the input image to filter noises and significantly keep image details to obtain a clear image. Moreover, since only a default high-pass filter and two low-pass filters are required to implement the above processing, and the required pixel mask is obtained through a fixed algorithm, the calculation complexity is decreased, and it unnecessary to additionally refer other images to cause memory consumption.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A method for reducing image noise, comprising:
performing a high-pass filtering operation on a plurality of pixels of a first image according to a default high-pass filtering mask to obtain a high-pass image;
performing a low-pass filtering operation on the pixels of the first image according to a first default filtering mask and a second default filtering mask to respectively obtain a first low-pass image and a second low-pass image, wherein the first default filtering mask is different to the second default filtering mask;
performing a difference calculation on the first low-pass image and the second low-pass image to obtain a low-pass difference image;
performing a pixel weighting calculation on the pixels according to the high-pass image and the low-pass difference image to obtain a pixel weighting mask corresponding to the first image; and
calculating the first image according to the pixel weighting mask and one of the first low-pass image and the second low-pass image to obtain a noise reducing image.

2. The method for reducing image noise as claimed in claim 1, wherein the step of performing the high-pass filtering operation on the pixels of the first image according to the default high-pass filtering mask comprises:
obtaining a target pixel and a plurality of adjacent pixels adjacent to the target pixel from the first image; and
performing the high-pass filtering operation on the target pixel and the adjacent pixels according to the default high-pass filtering mask to obtain a high-pass pixel value corresponding to the target pixel in the high-pass image.

3. The method for reducing image noise as claimed in claim 1, wherein the step of performing the low-pass filtering operation on the pixels of the first image according to the first default filtering mask and the second default filtering mask comprises:
performing a low-pass filtering operation on a target pixel and a plurality of adjacent pixels adjacent to the target pixel of the first image according to a first default filtering mask to obtain a first low-pass pixel value corresponding to the target pixel in the first low-pass image; and
performing a low-pass filtering operation on the target pixel and the adjacent pixels of the first image according to a second default filtering mask to obtain a second low-pass pixel value corresponding to the target pixel in the second low-pass image.

4. The method for reducing image noise as claimed in claim 3, wherein the step of performing the low-pass filtering operation on the pixels of the first image according to the first default filtering mask and the second default filtering mask is executed on the first image by two low-pass filters respectively having the first default filtering mask and the second default filtering mask.

5. The method for reducing image noise as claimed in claim 3, wherein the step of performing the low-pass filtering operation on the pixels of the first image according to the first default filtering mask and the second default filtering mask is executed on the first image by a low-pass filter by using different default filtering masks.

6. The method for reducing image noise as claimed in claim 1, wherein the step of performing the difference calculation on the first low-pass image and the second low-pass image comprises:

performing a subtraction operation on a first low-pass pixel value corresponding to the target pixel and a second low-pass pixel value corresponding to the target pixel to obtain a low-pass difference pixel value corresponding to the target pixel in the low-pass difference image.

7. The method for reducing image noise as claimed in claim 1, wherein the step of performing the pixel weighting calculation according to the high-pass image and the low-pass difference image to obtain the pixel weighting mask corresponding to the first image comprises:
   multiplying a high-pass pixel value corresponding to the target pixel by a low-pass difference pixel value corresponding to the target pixel and dividing a result thereof by a normalization constant to obtain a pixel weighting value corresponding to the target pixel in the pixel weighting mask.

8. The method for reducing image noise as claimed in claim 1, wherein the step of calculating the first image according to the pixel weighting mask and one of the first low-pass image and the second low-pass image comprises:
   multiplying a pixel value of the target pixel by a pixel weighting value corresponding to the target pixel for adding with a difference between a default value and the pixel weighting value times one of a first low-pass pixel value and a second low-pass pixel value corresponding to the target pixel, so as to obtain a reducing pixel value corresponding to the target pixel in the noise reducing image.

9. The method for reducing image noise as claimed in claim 8, further comprising:
   determining whether the reducing pixel value corresponding to all of pixel values in the first image has been obtained; and
   when the first image still has an unprocessed pixel, taking the unprocessed pixel as the target pixel to calculate and obtain the reducing pixel value corresponding to target pixel.

10. The method for reducing image noise as claimed in claim 1, wherein the noise reducing image is adapted to image compression.

11. An image processing device, comprising:
   an image obtaining unit, configured to obtain a first image; and
   a processor, configured to execute following steps:
      performing a high-pass filtering operation on a plurality of pixels of the first image according to a default high-pass filtering mask to obtain a high-pass image;
      performing a low-pass filtering operation on the pixels of the first image according to a first default filtering mask and a second default filtering mask to respectively obtain a first low-pass image and a second low-pass image, wherein the first default filtering mask is different to the second default filtering mask;
      performing a difference calculation on the first low-pass image and the second low-pass image to obtain a low-pass difference image;
      performing a pixel weighting calculation on the pixels according to the high-pass image and the low-pass difference image to obtain a pixel weighting mask corresponding to the first image; and
      calculating the first image according to the pixel weighting mask and one of the first low-pass image and the second low-pass image to obtain a noise reducing image.

12. The image processing device as claimed in claim 11, wherein the processor obtains a target pixel and a plurality of adjacent pixels adjacent to the target pixel from the first image, and performs the high-pass filtering operation on the target pixel and the adjacent pixels according to the default high-pass filtering mask to obtain a high-pass pixel value corresponding to the target pixel in the high-pass image.

13. The image processing device as claimed in claim 11, wherein the processor performs a low-pass filtering operation on a target pixel and a plurality of adjacent pixels adjacent to the target pixel of the first image according to a first default filtering mask to obtain a first low-pass pixel value corresponding to the target pixel in the first low-pass image, and performs a low-pass filtering operation on the target pixel and the adjacent pixels of the first image according to a second default filtering mask to obtain a second low-pass pixel value corresponding to the target pixel in the second low-pass image.

14. The image processing device as claimed in claim 11, wherein the processor performs a subtraction operation on a first low-pass pixel value corresponding to the target pixel and a second low-pass pixel value corresponding to the target pixel to obtain a low-pass difference pixel value corresponding to the target pixel in the low-pass difference image.

15. The image processing device as claimed in claim 11, wherein the processor multiplies a high-pass pixel value corresponding to the target pixel by a low-pass difference pixel value corresponding to the target pixel and divides a result thereof by a normalization constant to obtain a pixel weighting value corresponding to the target pixel in the pixel weighting mask.

16. The image processing device as claimed in claim 11, wherein the processor multiplies a pixel value of the target pixel by a pixel weighting value corresponding to the target pixel for adding with a difference between a default value and the pixel weighting value times one of a first low-pass pixel value and a second low-pass pixel value corresponding to the target pixel, so as to obtain a reducing pixel value corresponding to the target pixel in the noise reducing image.

17. An image processing device, comprising:
   at least one high-pass filter, receiving a first image, and performing a high-pass filtering operation on a plurality of pixels of the first image according to a default high-pass filtering mask to obtain a high-pass image;
   at least two low-pass filters, performing a low-pass filtering operation on the pixels of the first image according to different default filtering masks to generate at least two low-pass images;
   a difference calculation module, performing a difference calculation on the at least two low-pass images to obtain a low-pass difference image;
   a pixel weighting calculation module, performing a pixel weighting calculation according to the high-pass image and the low-pass difference image to generate a pixel weighting mask corresponding to the first image; and
   an image merging module, calculating the first image according to the pixel weighting mask and one of the first low-pass image and the second low-pass image to generate a noise reducing image.

* * * * *